(12) United States Patent
Park

(10) Patent No.: US 10,972,712 B2
(45) Date of Patent: *Apr. 6, 2021

(54) IMAGE MERGING METHOD USING VIEWPOINT TRANSFORMATION AND SYSTEM THEREFOR

(71) Applicant: CENTER FOR INTEGRATED SMART SENSORS FOUNDATION, Daejeon (KR)

(72) Inventor: Ki Yeong Park, Daejeon (KR)

(73) Assignee: CENTER FOR INTEGRATED SMART SENSORS FOUNDATION, Daejeon (KR)

(*) Notice: Subject to any disclaimer, the term of this patent is extended or adjusted under 35 U.S.C. 154(b) by 92 days.

This patent is subject to a terminal disclaimer.

(21) Appl. No.: 16/201,906

(22) Filed: Nov. 27, 2018

(65) Prior Publication Data

US 2019/0166350 A1 May 30, 2019

(30) Foreign Application Priority Data

Nov. 29, 2017 (KR) .................. 10-2017-0161345

(51) Int. Cl.
*H04N 13/00* (2018.01)
*H04N 13/111* (2018.01)
*H04N 5/235* (2006.01)
*H04N 13/156* (2018.01)
*H04N 13/239* (2018.01)

(52) U.S. Cl.
CPC ......... *H04N 13/111* (2018.05); *H04N 5/2355* (2013.01); *H04N 13/156* (2018.05); *H04N 13/239* (2018.05)

(58) Field of Classification Search
CPC ... G06T 3/0068; G06T 3/4038; H04N 13/111; H04N 13/128; H04N 13/271; H04N 13/239; H04N 5/232; H04N 5/23238
See application file for complete search history.

(56) References Cited

U.S. PATENT DOCUMENTS

| | | | |
|---|---|---|---|
| 2015/0187091 A1* | 7/2015 | Hata | G06T 7/75 |
| | | | 382/101 |
| 2016/0057332 A1* | 2/2016 | Ciurea | H04N 5/23232 |
| | | | 348/218.1 |
| 2017/0308990 A1* | 10/2017 | Middleton | H04N 13/271 |
| 2017/0318280 A1* | 11/2017 | Nisenzon | H04N 13/271 |
| 2018/0139431 A1* | 5/2018 | Simek | H04N 13/254 |

FOREIGN PATENT DOCUMENTS

| | | |
|---|---|---|
| JP | 2004287517 | 10/2004 |
| KR | 100490885 | 5/2005 |
| KR | 20120093751 | 8/2012 |
| KR | 101406073 | 6/2014 |
| KR | 20160048140 | 5/2016 |

\* cited by examiner

*Primary Examiner* — Ping Y Hsieh
(74) *Attorney, Agent, or Firm* — Cozen O'Connor

(57) ABSTRACT

An image merging method using viewpoint transformation and a system therefor are provided. The method includes obtaining images captured by a plurality of cameras included in the camera system, performing viewpoint transformation for each of the images using a depth map for the images, and merging the images, the viewpoint transformation of which is performed.

13 Claims, 11 Drawing Sheets

310

IMAGE MERGING METHOD USING VIEWPOINT TRANSFORMATION AND SYSTEM THEREFOR

CROSS-REFERENCE TO RELATED APPLICATIONS

This application claims priority under 35 U.S.C. § 119 to Korean Patent Application No. 10-2017-0161345 filed on Nov. 29, 2017, in the Korean Intellectual Property Office, the disclosures of which are incorporated by reference herein in their entireties.

BACKGROUND

Embodiments of the inventive concept described herein relate to an image merging system and a method therefor, and more particularly, relate to technologies of merging images using viewpoint transformation and technologies of transforming viewpoints of the images and registering the images.

Methods of capturing several images and merging the images have been used to overcome limits of general digital cameras. Representative examples thereof are high dynamic range (HDR) imaging and focus stacking. The HDR imaging is to capture one scene using optimum exposure, overexposure, underexposure, and the like to produce several images and synthesize the images to overcome 300:1 which is a limit of a contrast capable of being obtained by a general digital camera. The focus stacking is to focus several images at different distances and capture the images (capture images with different focus positions) and synthesize the images to obtain an image with a very deep depth of field. The focus stacking may be technologies frequently used for close-up or photomicrography and may be used for scenery pictures.

Such image merging schemes are subject to accurate registration between images to be merged, so they use images which are captured while fixing a camera using one camera and changing settings of exposure or a focus position with respect to a fixed subject or are captured at a high speed while changing the settings. Such schemes are disclosed in the paper, Eden, Uyttendaele, and Szeliski, "Seamless image stitching of scenes with large motions and exposure differences", CVPR 2006 or Kang, Uyttendaele, Winder, and Szeliski, "High dynamic range video", SIGGRAPH 2003) HDR imaging.

However, in such a conventional image merging scheme, it is unable to obtain an accurately merged image when there is a little motion of a subject in a process of capturing the subject at a high speed and there is a need for a separate lighting device for obtaining sufficient exposure within a short image capturing time.

Thus, to address problems and disadvantages of the conventional image merging scheme, embodiments below propose technologies of accurately merging images simultaneously captured by a plurality of cameras.

SUMMARY

Embodiments of the inventive concept provide an image merging method for accurately registering and merging images simultaneously captured by a plurality of cameras, a system therefor, and a computer program stored in a computer-readable storage medium to be combined with a computer and execute the image merging method.

Embodiments of the inventive concept provide an image merging method for matching viewpoints of images and registering and merging the images by performing viewpoint transformation for each of the images using a viewpoint transformation formula based on a depth map for the images simultaneously captured by a plurality of cameras, a system therefor, and a computer program.

Embodiments of the inventive concept provide an image merging method for enhancing completion of a merged image by filling a hole in images, viewpoint transformation of which is performed, and the merged image, a system therefor, and a computer program.

Embodiments of the inventive concept provide an image registration method for matching viewpoints of images and registering the images by performing viewpoint transformation for each of the images using a viewpoint transformation formula based on a depth map for the images, a system therefor, and a computer program stored in a computer-readable storage medium to be combined with a computer and execute the image registration method.

According to an exemplary embodiment, an image merging method using viewpoint transformation executed by a computer included in a camera system may include obtaining images captured by a plurality of cameras included in the camera system, performing viewpoint transformation for each of the images using a depth map for the images, and merging the images, the viewpoint transformation of which is performed.

The performing of the viewpoint transformation for each of the images may include setting a viewpoint transformation formula based on a focal length of each of the plurality of cameras, a length of a baseline of the camera system, and parallax between the plurality of cameras, based on the depth map, determining a movement parameter in the viewpoint transformation formula, the movement parameter being a value associated with a distance to move when a location where each of the images is captured moves to a virtual specific location, and transforming viewpoints of the images using the viewpoint transformation formula to be matched.

The determining of the movement parameter in the viewpoint transformation formula may include determining the movement parameter based on a distance to move when an optical center of each of the plurality of cameras moves to a virtual reference location of the camera system.

The determining of the movement parameter in the viewpoint transformation formula may include determining the movement parameter based on the length of the baseline of the camera system.

The transforming of the viewpoints of the images to be matched may include transforming the viewpoint of each of the images into a viewpoint of an image captured at a reference location of the camera system.

The performing of the viewpoint transformation for each of the images may further include filling a hole of the depth map before performing the viewpoint transformation for each of the images.

The performing of the viewpoint transformation for each of the images may further include filling a hole of each of the images, the viewpoint transformation of which is performed.

The merging of the images, the viewpoint transformation of which is performed, may further include transforming a viewpoint of the merged image to fill a hole of the merged image.

The obtaining of the images captured by the plurality of cameras may include obtaining the images with different exposure values from the plurality of cameras. The merging of the images, the viewpoint transformation of which is performed, may include merging the images, with the different exposure values, the viewpoint transformation of which is performed, to generate a hyper dynamic range (HDR) image.

The obtaining of the images captured by the plurality of cameras may include obtaining the images with different focus positions from the plurality of cameras. The merging of the images, the viewpoint transformation of which is performed, may include merging the images, with the different focus positions, the viewpoint transformation of which is performed, to generate an all-in-focus image.

According to an exemplary embodiment, a computer program stored in a computer-readable storage medium may be combined with a computer and may execute an image merging method using viewpoint transformation, the method including obtaining images captured by a plurality of cameras included in a camera system, performing viewpoint transformation for each of the images using a depth map for the images, and merging the images, the viewpoint transformation of which is performed.

According to an exemplary embodiment, an image merging system using viewpoint transformation, implemented with a computer included in a camera system, may include at least one processor configured to execute computer-readable instructions. The at least one processor may include an image obtaining unit configured to obtain images captured by a plurality of cameras included in the camera system, a viewpoint transformation performing unit configured to perform viewpoint transformation for each of the images using a depth map for the images, and a merging unit configured to merge the images, the viewpoint transformation of which is performed.

According to an exemplary embodiment, an image registration method executed by a computer included in a camera system may include obtaining images captured by a plurality of cameras included in the camera system, setting a viewpoint transformation formula based on a focal length of each of the plurality of cameras, a length of a baseline of the camera system, and parallax between the plurality of cameras, based on a depth map for the images, determining a movement parameter in the viewpoint transformation formula, the movement parameter being a value associated with a distance to move when a location where each of the images is captured moves to a virtual specific location, and registering images by transforming viewpoints of the images using the viewpoint transformation formula to be matched.

The determining of the movement parameter in the viewpoint transformation formula may include determining the movement parameter based on a distance to move when an optical center of each of the plurality of cameras moves to a virtual reference location of the camera system.

According to an exemplary embodiment, a computer program stored in a computer-readable storage medium may be combined with a computer and may execute an image registration method including obtaining images captured by a plurality of cameras included in a camera system, setting a viewpoint transformation formula based on a focal length of each of the plurality of cameras, a length of a baseline of the camera system, and parallax between the plurality of cameras, based on a depth map for the images, determining a movement parameter in the viewpoint transformation formula, the movement parameter being a value associated with a distance to move when a location where each of the images is captured moves to a virtual specific location, and registering the images by transforming viewpoints of the images using the viewpoint transformation formula to be matched.

According to an exemplary embodiment, an image registration system implemented with a computer included in a camera system may include at least one processor configured to execute computer-readable instructions. The at least one processor may include an image obtaining unit configured to obtain images captured by a plurality of cameras included in the camera system, a formula setting unit configured to set a viewpoint transformation formula based on a focal length of each of the plurality of cameras, a length of a baseline of the camera system, and parallax between the plurality of cameras, based on a depth map for the images, a movement parameter determining unit configured to determine a movement parameter in the viewpoint transformation formula, the movement parameter being a value associated with a distance to move when a location where each of the images is captured moves to a virtual specific location, and an image registration unit configured to register the images by transforming viewpoints of the images using the viewpoint transformation formula to be matched.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, a description will be given in detail of embodiments of the inventive concept with reference to the accompanying drawings.

Figure 1:
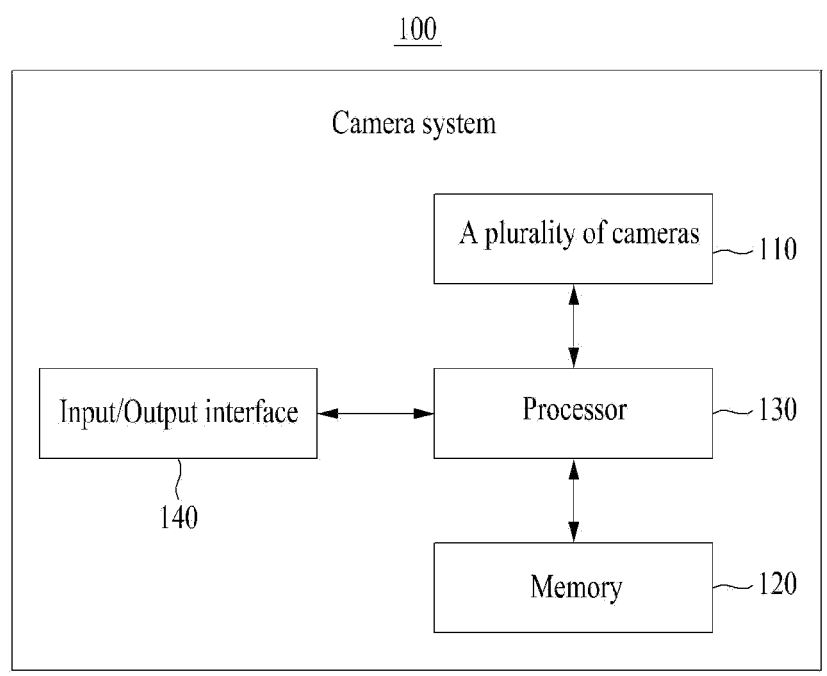
FIG. 1 is a block diagram illustrating a configuration of a camera system according to an embodiment.

FIG. 1 is a block diagram illustrating a configuration of a camera system according to an embodiment.

Referring to FIG. 1, a camera system 100 according to an embodiment may include a plurality of cameras 110, a memory 120, a processor 130, and an input/output interface 140. Hereinafter, an embodiment is exemplified as the camera system 100 is a stereo camera system in which the plurality of cameras 110 (e.g., 2 cameras) are horizontally arranged. Embodiments are not limited thereto. For example, the camera system 100 may be various camera systems in which the plurality of cameras 110 are located to simultaneously capture the same subject.

The memory 120 may be a computer-readable storage medium and may include a non-volatile mass storage device such as a random access memory (RAM), a read only memory (ROM), and a disc drive. Furthermore, the memory 120 may store an operating system (OS), an image captured by each of the plurality of cameras 110, or at least one program code (e.g., a code for performing an image merging method described below). Such software components may be loaded from a computer-readable storage medium independent of the memory 120. Such a computer-readable storage medium may include computer-readable storage media such as a floppy drive, a disk, a tape, a digital versatile disc/compact disc-ROM (DVD/CD-ROM) drive, and a memory card. In another embodiment, software components may be loaded into the memory 120 via a communication module (not shown) rather than a computer-readable storage medium.

The processor 130 may be configured to process instructions of a computer program by performing basic calculation and logic and a basic input/output arithmetic operation. The instructions may be provided to the processor 130 by the memory 120 or the communication module. For example, the processor 130 may be configured to execute instructions received according to a program code (e.g., a code for performing the image merging method described below) stored in a storage device such as the memory 120.

The input/output interface 140 may be a means for interfacing with an input/output device (not shown). For example, the input device may include devices such as a touch screen and a button included in the camera system 100, and the output device may include a device such as a display which displays captured images. For another example, the input/output interface 140 may be a means for interfacing with a device, such as a touch screen, in which functions for an input and an output integrate into one.

In another embodiment, the camera system 100 may include more components than the components of FIG. 1. However, there is no need for clearly illustrating most conventional components. For example, the camera system 100 may further include other components, for example, a transceiver, a global positioning system (GPS) module, various sensors, and a database.

Hereinafter, a description will be given of a detailed embodiment of an image merging method executed by the processor 130 included in the above-mentioned camera system 100 and a detailed embodiment of an image merging system including the processor 130.

Figure 2:
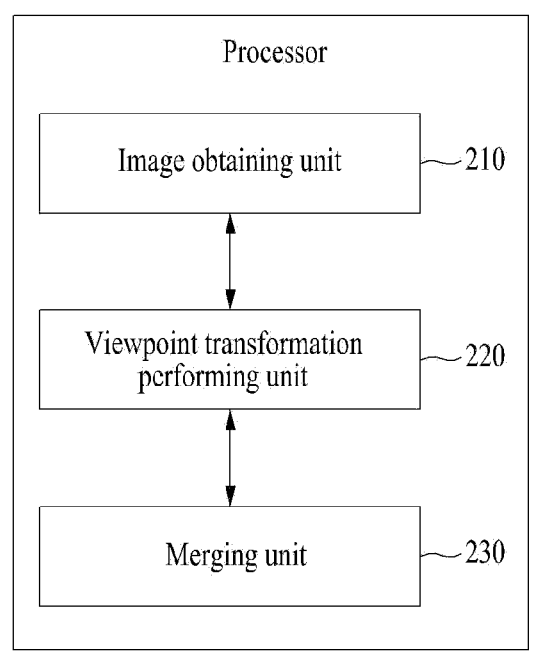
FIG. 2 is a block diagram illustrating an example of components capable of being included in a processor of a camera system according to an embodiment.

FIG. 2 is a block diagram illustrating an example of components capable of being included in a processor of a camera system according to an embodiment.

Referring to FIG. 2, an image merging system according to an embodiment may be configured to include a processor 130 of a camera system 100 with reference to FIG. 1. In detail, as shown, the image merging system may include an image obtaining unit 210, a viewpoint transformation performing unit 220, and a merging unit 230 which are components of the processor 130. According to an embodiment, the components of the processor 130 may be selectively included or excluded from the processor 130. Furthermore, according to an embodiment, the components of the processor 130 may be separated or merged for a representation of a function of the processor 130. For example, at least some of the components of the processor 130 may be implemented in a processor included in a separate server communicatively connected with the camera system 100.

Figure 8:
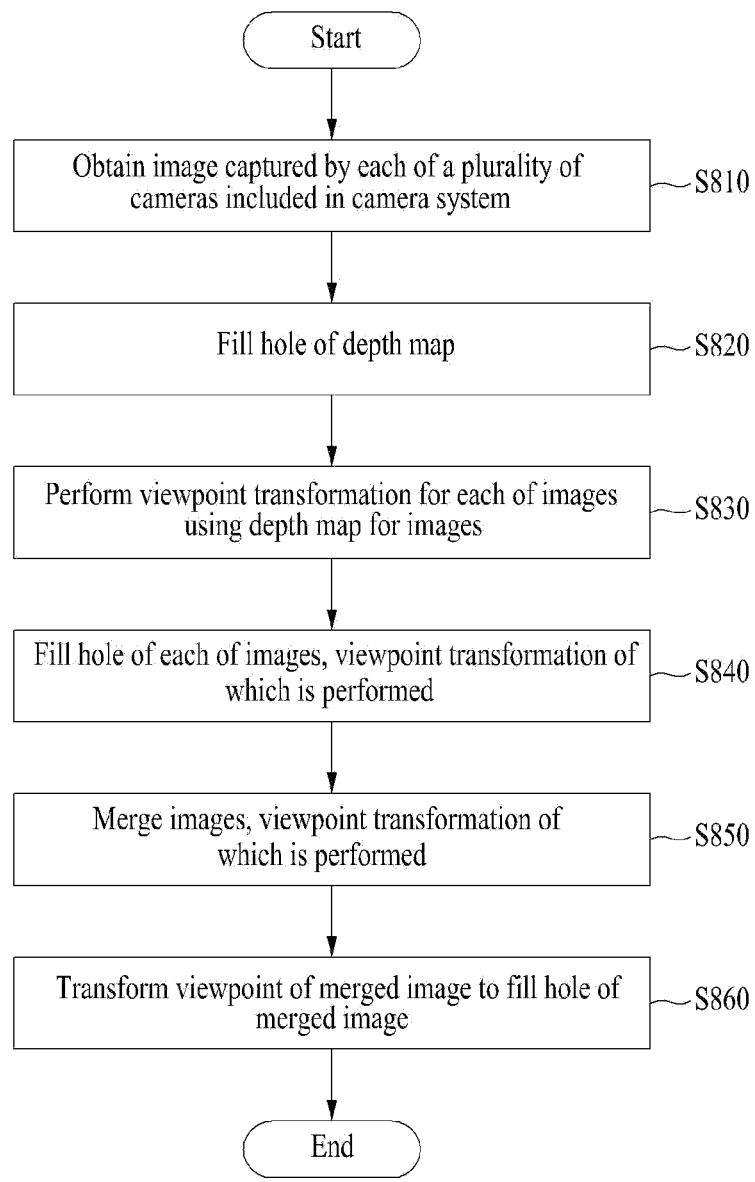
FIG. 8 is a flowchart illustrating an image merging method according to an embodiment.

Such components of the processor 130 may be implemented to execute instructions of a code of an operating system (OS) and instructions of at least one program (e.g., a program configured with a code executing an image merging method), included in a memory 120 of FIG. 2 to perform operations S810 to S860 included in the image merging method of FIG. 8.

Herein, the components of the processor 130 may be representations of different functions according to instructions provided from a program code stored in the memory 120. For example, the image obtaining unit 210 may be used as a functional representation for an operation of obtaining an image captured by each of a plurality of cameras 110 included in the camera system 100.

Thus, the respective components of the processor 130 may perform the image merging method by performing the following operations. In detail, the image obtaining unit 210 may obtain an image captured by each of the plurality of cameras 110 included in the camera system 100 (hereinafter, the images captured by the plurality of cameras 110 may refer to images simultaneously captured by the plurality of cameras 110). The viewpoint transformation performing unit 220 may perform viewpoint transformation for each of the images using a depth map for the images. The merging unit 230 may merge the images, the viewpoint transformation of which is performed. The image merging system may not need to fix a camera to merge several images, each of has a different aperture or a different focus position, may transform a viewpoint of each of the images as if the images are captured in the same location in a situation where a subject is moved, and may register and merge the images. A detailed description will be given of an operation of each of the components with reference to FIG. 8. A detailed description will be given of an operation principle of the viewpoint transformation performing unit 220 with reference to FIGS. 3 to 7.

FIGS. 3 to 7 are drawings illustrating an image merging method according to an embodiment.

Figure 3:
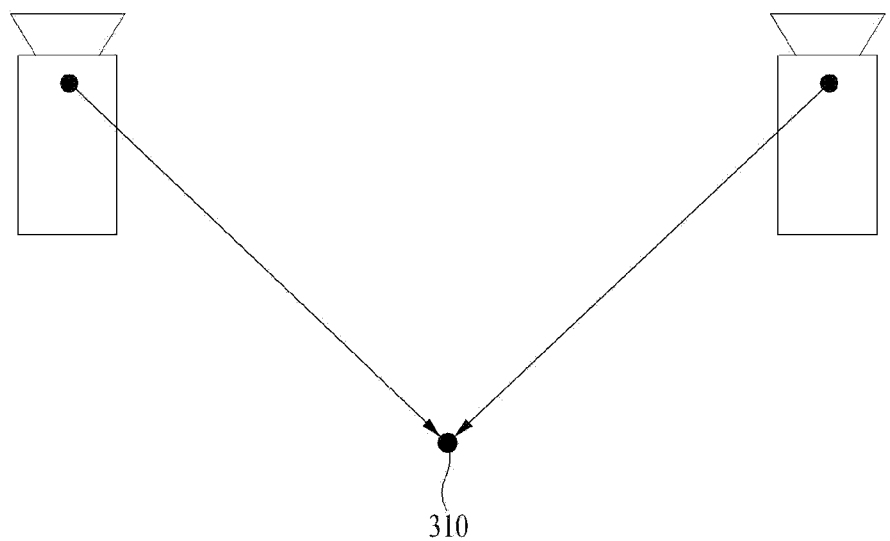
FIGS. 3, 4, 5, 6, and 7 are drawings illustrating an image merging method according to an embodiment.

Referring to FIG. 3, an image merging system according to an embodiment may transform an image captured by each of a plurality of cameras 110 as if the image is captured in the same location 310, by matching an optical center of each of the plurality of cameras 110 configuring a camera system 100 of FIG. 1 to the virtual specific location 310. Hereinafter, the virtual specific location 310 may refer to a virtual reference location of the camera system 100. The virtual reference location of the camera system 100 may be any point moved behind the plurality of cameras 110 over a constant distance in consideration of the plurality of cameras 110 configuring the camera system 100. For example, when the camera system 100 is a stereo camera system in which two cameras are horizontally arranged, the virtual reference location may be a point moved backward from a middle point of the plurality of cameras 110 over a constant distance.

In this case, when the optical center of each of the plurality of cameras 110 is matched to the virtual specific location 310, viewpoints of the images captured by the plurality of cameras 110 may also coincide with each other.

In other words, the image merging system may perform the image merging method by transforming viewpoints of images simultaneously captured by the plurality of cameras 110 like viewpoints of images captured at the virtual specific location 310, rather than actually moving each of the plurality of cameras 110.

Figure 4:
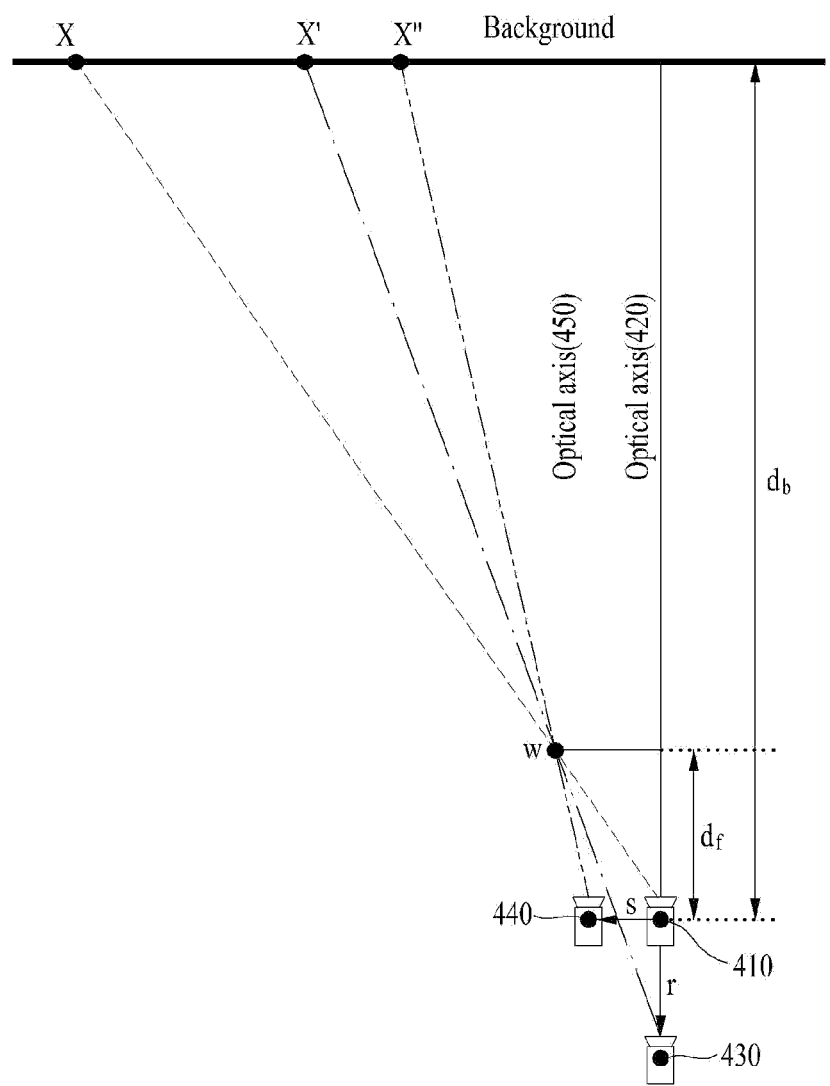

Referring to FIG. 4, point w spaced apart from a camera at a specific location 410 by distance $d_f$ may appear at a location away from a background at distance $d_b$ on an optical axis 420 by X. When the camera is arranged at a location 430 moved backward from the specific location 410 by r, this location may change to location X'. When the camera is arranged at a location 440 moved sideward from the specific location 410 by s, this location may change to a location away from the background on an optical axis 450 by X".

Figure 5:
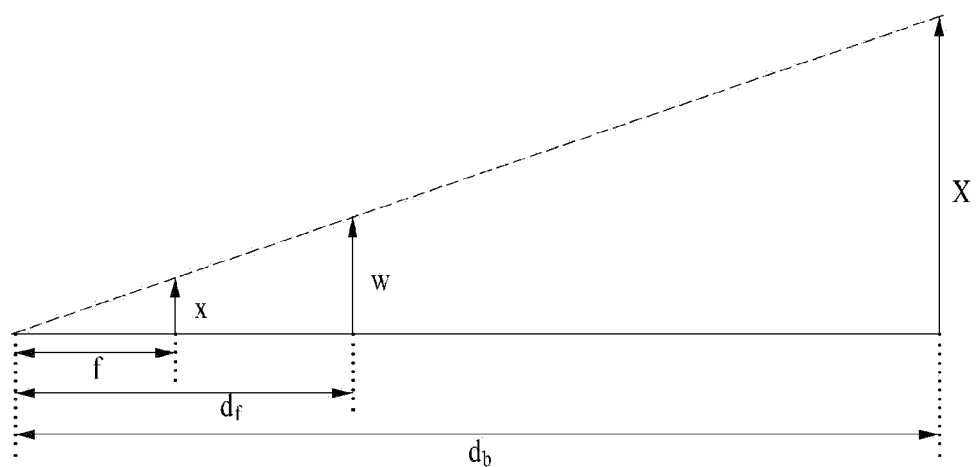
Figure 6:
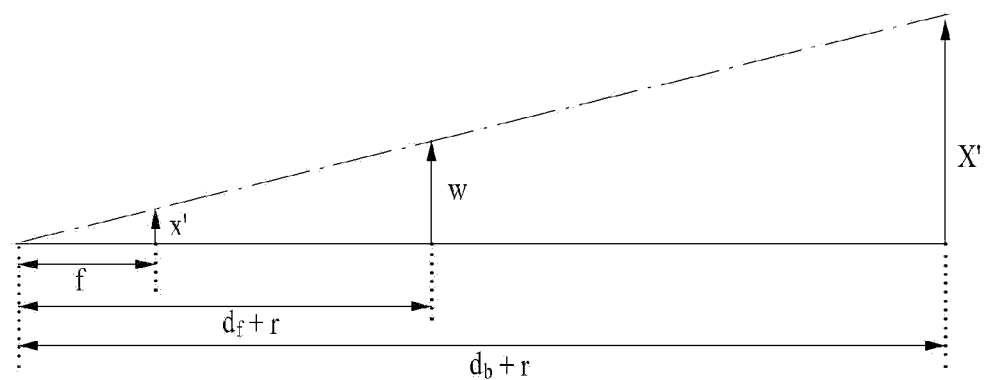
Figure 7:
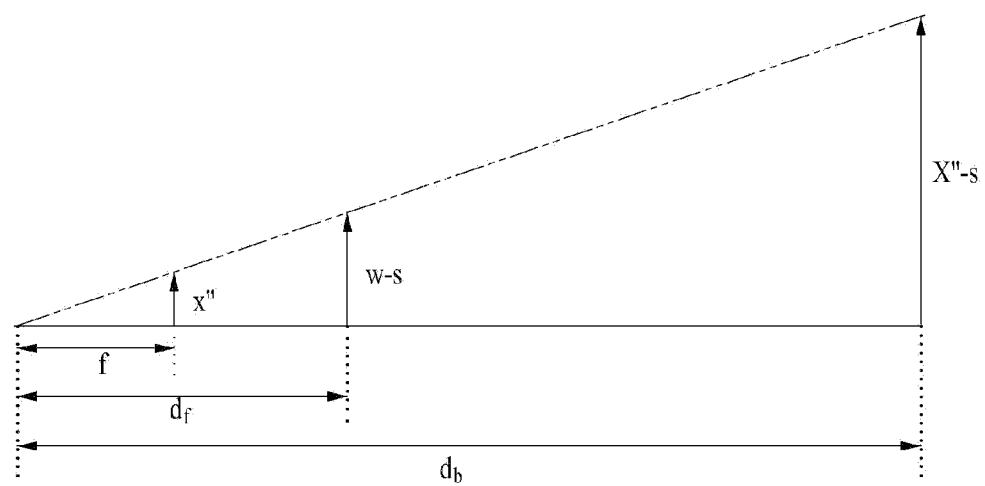

When such locations X, X', and X" appear at locations away from the center of an image on the image by x, x', and x", the locations may be calculated using a pinhole camera model shown in FIGS. 5 to 7.

For example, when the camera moves to the location 430 moved backward from the specific location 410 by r, as shown in FIG. 4, X' may be calculated using Equation 1 below.

$$X' = w \cdot \frac{d_b + r}{d_f + r} \qquad \text{[Equation 1]}$$

Furthermore, X' calculated using Equation 1 above may be represented as Equation 2 below in an image using a pinhole camera model shown in FIGS. 5 and 6.

$$x' = x \cdot \frac{d_f}{d_f + r} \qquad \text{[Equation 2]}$$

Meanwhile, depth d and parallax D have a relationship of $$d = \frac{fB}{D}$$

in a depth map (here, f refers to a focal length, B refers to a length of a baseline of the camera system 100, and D refers to parallax), Equation 2 above may be represented as Equation 3 below.

$$x' = x \cdot \frac{fB}{fB + rD} \qquad \text{[Equation 3]}$$

For another example, when the camera moves to the location 440 away sideward from the specific location 410 by s, as shown in FIG. 4, X" may be calculated using Equation 4 below.

$$X'' - s = X - s \cdot \frac{d_b}{d_f} \qquad \text{[Equation 4]}$$

Furthermore, X" calculated using Equation 4 above may be represented as Equation 5 below in the image using the pinhole camera model shown in FIGS. 5 to 7 and may be represented as Equation 6 below depending on a relationship between depth d and parallax D.

$$x'' = x - s \cdot \frac{f}{d_f} \qquad \text{[Equation 5]}$$

$$x'' = x - s \cdot \frac{D}{B} \qquad \text{[Equation 6]}$$

Thus, when the camera moves to a location moved backward from the specific location 410 by r and away sideward from the specific location 410 by s, x" may be calculated using Equation 7 below in the image using the pinhole camera model shown in FIGS. 5 to 7.

$$x'' = \frac{xd_f - sf}{d_f + r} \qquad \text{[Equation 7]}$$

Furthermore, Equation 7 above may be represented as Equation 8 below depending on a relationship between depth d and parallax D.

$$x'' = \frac{xfB - fsD}{fB + rD} \qquad \text{[Equation 8]}$$

A viewpoint transformation formula of transforming an image captured at the specific location 410 by the camera into an image captured when the camera moves from the specific location 410 in x, y, and z directions by $m_x$, $m_y$, and $m_z$ may be obtained from Equation 8 above. When x, y, x', and y' are pixel locations in each image with respect to an original image I(x, y) captured at the specific location 410 by the camera and a transformed image I'(x', y') which is an image captured when the camera moves from the specific location 410 by $m_x$, $m_y$, and $m_z$, forward warping may be represented as Equation 9 below. Backward warping may be represented as Equation 10 below.

$$I(x', y') = I\left(x \cdot \frac{xfB - fm_xD}{fB + m_zD} - c_x, y \cdot \frac{yfB - fm_yD}{fB + m_zD} - c_y\right) \qquad \text{[Equation 9]}$$

$$I(x, y) = I\left(\frac{x'(fB + m_zD) + fm_xD}{fB} - c_x, \frac{y'(fB + m_yD) + fm_zD}{fB} - c_y\right) \qquad \text{[Equation 10]}$$

In Equations 9 and 10, $c_x$ and $c_y$ may refer to coordinates of the image center passing through the optical axes 420 and 450.

The image merging system according to an embodiment may register and merge images by performing viewpoint transformation for the images using the derived Equations 9 and 10. A detailed description thereof will be given with reference to FIG. 8. A detailed description will be given of a system and method for performing viewpoint transformation of images and registering the images with reference to FIGS. 10 and 11.

Figure 9:
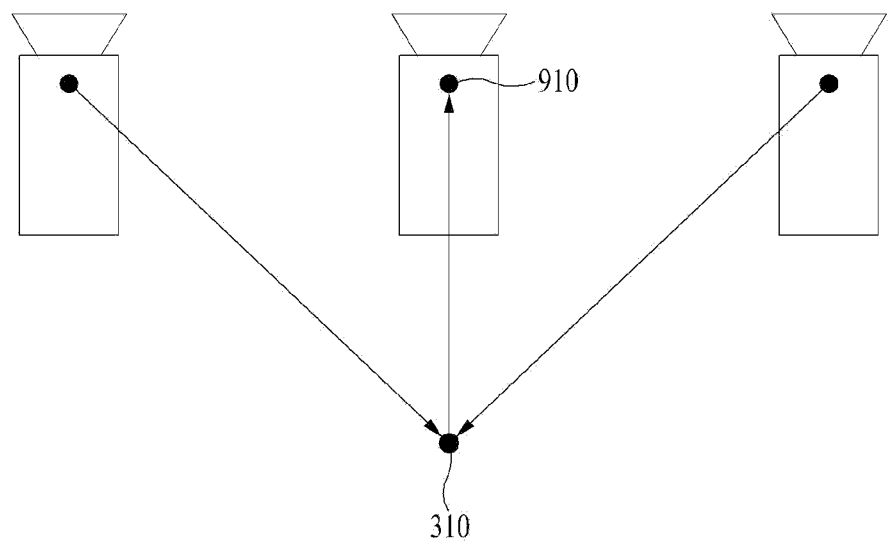
FIG. 9 is a drawing illustrating a process of retransforming a viewpoint of an image according to an embodiment.

FIG. 8 is a flowchart illustrating an image merging method according to an embodiment. FIG. 9 is a drawing illustrating a process of retransforming a viewpoint of an image according to an embodiment.

Referring to FIG. 8, in operation S810, an image obtaining unit 210 included in an image merging system according to an embodiment may obtain an image captured by each of a plurality of cameras 110 included in a camera system 100 of FIG. 1. Herein, the image captured by each of the plurality of cameras 110 may be each of images simultaneously captured by the plurality of cameras 110 after the plurality of cameras 110 operate simultaneously. In this case, the plurality of cameras 110 may be physically separated (spaced apart) from each other to capture the same subject, so parallax may occur between images (the images captured by the plurality of cameras 110).

Furthermore, in operation S810, the image obtaining unit 210 may further obtain a depth map for the images concurrently with obtaining the images. Hereinafter, the depth map for the images may be obtained as an image defining a relationship between parallax and depth throughout all pixels of the image through an existing algorithm of obtaining the depth map at the same time the images are captured.

In this case, when the plurality of cameras 110 are two left and right cameras and when a left-to-right depth map and a right-to-left depth map are obtained using an image captured by the left camera and an image captured by the right camera, a hole may occur in a region where the image captured by the left camera and the image captured by the right camera are not registered.

Thus, in operation S820, the image merging system may fill the hole of the depth map before operation S830. For example, the image merging system may fill a value of a pixel corresponding to the hole with a pixel value of a region adjacent to the region where the hole occurs in the depth map. An embodiment is exemplified as such operation S820 is performed by the image merging system, but, more accurately, is performed by any one of an image obtaining unit 210, a viewpoint transformation performing unit 220, or a merging unit 230 included in the image merging system. However, embodiments are not limited thereto. For example, such operation S820 may be performed by a component (not shown) independent of the image obtaining unit 210, the viewpoint transformation performing unit 220, and the merging unit 230 among the components included in the image merging system.

In operation S830, the viewpoint transformation performing unit 220 included in the image merging system may perform viewpoint transformation for each of the images using the depth map for the images. In detail, the viewpoint transformation performing unit 220 may set a viewpoint transformation formula (e.g., Equation 9 or 10 described above) based on a focal length of each of the plurality of cameras 110, a length of a baseline of the camera system 100, and parallax between the plurality of cameras 110, based on the depth map, and may determine a movement parameter in the viewpoint transformation formula, thus transforming viewpoints of the images using the viewpoint transformation formula to be matched. Hereinafter, transforming the viewpoints of the images to be matched may refer to registering the images.

Herein, the movement parameter may be a value associated with a distance to move when a location where each of the images is captured moves to a virtual specific location and may correspond to $m_x$, $m_y$, and $m_z$ in Equations 9 and 10 above. Thus, for the viewpoint transformation performing unit 220 to determine the movement parameter may refer to determining a distance to move, when an optical center of each of the plurality of cameras 110 moves to a virtual reference location of the camera system 100, as the movement parameter. In this case, as shown in FIG. 3, when the camera system 100 is a stereo camera system in which two cameras are horizontally located, the virtual reference location may refer to a point 310 moved backward from a middle point of the two cameras over a constant distance. When the camera system 100 is a 360-degree camera system, the virtual reference location may refer to a center point of a circle on which the plurality of cameras 110 are arranged. For example, as shown in FIG. 3, when the camera system 100 is the stereo camera system in which the two cameras are horizontally located, the viewpoint transformation performing unit 220 may determine $m_x$ or $m_y$ as half the size of a baseline of the stereo camera system. When the camera system 100 is the 360-degree camera system, the viewpoint transformation performing unit 220 may determine only a value of $m_z$ in Equation 9 or 10 above.

As such, to determine the distance to move, when the optical center of each of the plurality of cameras 110 moves to the virtual reference location of the camera system 100, as the movement parameter, it may be essential to perform an operation of checking the optical center of each of the plurality of cameras 110. Although not illustrated, such an operation may be adaptively performed at any time before operation S830. Such an operation may be performed by experimentally searching for a location of a rotary axis of each of the plurality of cameras 110, where parallax does not occur when the rotary axis moves forward and backward and rotates left and right.

In this case, when optical centers of the plurality of cameras 110 are matched with each other, viewpoints of images captured by the plurality of cameras 110 may also coincide with each other.

Thus, in operation S830, the viewpoint transformation performing unit 220 may transform the viewpoint of each of the images into a viewpoint of an image captured at a reference location of the camera system 100 and may match the viewpoints of the images, thus registering the images. As shown in FIG. 3, when the camera system 100 is the stereo camera system in which the two cameras are horizontally located, the viewpoint transformation performing unit 220 may perform virtual transformation in which each of the plurality of cameras 110 moves to a point moved backward from a middle point of the plurality of cameras 110 over a constant distance. When the camera system 100 is the 360-degree camera system, the viewpoint transformation performing unit 220 may perform virtual transformation in which each of the plurality of cameras 110 moves to the point 310 moved backward (a central point of a circle on which the plurality of cameras 110 are arranged).

In this case, for the viewpoint transformation performing unit 220 to match the viewpoint of each of the images to the viewpoint of the mage captured at the reference location moved backward from the viewpoint of each of the plurality of cameras 110 over the constant distance in operation S830 may be minimize occurrence of occlusion.

After the viewpoint transformation for each of the images is performed, in operation S840, the image merging system may fill a hole of each of the images, the viewpoint transformation of which is performed. For example, the image merging system may fill a value of a pixel corresponding to the hole with a pixel value of a region adjacent to a region where the hole occurs in each of the images, the viewpoint transformation of which is performed. For another example, when regions, each of which has a hole, differ from each other in the images, the viewpoint transformation of which is performed, the image merging system may fill a value of a pixel corresponding to the hole in a first image, the viewpoint transformation of which is performed, with a pixel value of a region corresponding to the hole of the first image in a second image, the viewpoint transformation of which is performed. Likewise, the image merging system may fill a value of a pixel corresponding to the hole in the second image, the viewpoint transformation of which is performed, with a pixel value of a region corresponding to the hole of the second image in the first image, the viewpoint transformation of which is performed. An embodiment is exemplified as such operation S840 is performed by the image merging system, but, more accurately, is performed by any one of the image obtaining unit 210, the viewpoint transformation performing unit 220, or the merging unit 230. However, embodiments are not limited thereto. For example, operation S840 may be performed by a component (not shown) independent of the image obtaining unit 210, the viewpoint transformation performing unit 220, and the merging unit 230 among the components included in the image merging system.

In operation S850, the merging unit 230 included in the image merging system may merge the images, the viewpoint transformation of which is performed. A conventional compositing scheme may be used as a merging scheme, so a detailed description therefor will be omitted since it departs from the scope and spirit of the inventive concept.

In operation S860, the viewpoint transformation performing unit 220 may transform a viewpoint of the merged image to fill a hole of the merged image. To transform the viewpoint of the merged image may be performed in a direction opposite to operation S830 in the same principle as operation S830. For example, when transformation moved from a viewpoint of each of the images to a viewpoint of an image captured at the point 310 moved backward is performed in operation S830, in operation S860, as shown in FIG. 9, the viewpoint transformation performing unit 220 may perform transformation moved from the point 310 moved backward to a point 910 moved forward. Thus, most of a hole which occurs while the viewpoint of each of the images is moved backward may be filled.

As such, according to the above-mentioned embodiments, the image merging method for performing viewpoint transformation for each of the images using a viewpoint transformation formula based on a depth map, matching viewpoints of the images (matching optical centers of the plurality of cameras 110), and registering and merging the images, the system therefor, and the computer program may be proposed, so the system may not need to fix a camera to merge different images, each of which has a different aperture or a different focus position, and transform viewpoints of the images as if the images are captured at the same location in a situation where a subject is moved, thus merging the images.

Such an image merging scheme may be used in the field such as high dynamic range (HDR) imaging or focus stacking. For example, in operation S810, the image obtaining unit 210 may obtain images with different exposure values (e.g., an image with an exposure value greater than or equal to a constant value and an image with an exposure value less than the constant value) from the plurality of cameras 110. Thus, in operation S850, the merging unit 230 may merge the images with the different exposure values, viewpoint transformation of which is performed, to generate an HDR image. For another example, in operation S810, the image obtaining unit 210 may obtain images with different focus positions (e.g., an image focused at a long distance and an image focused at a short distance) from the plurality of cameras 110. Thus, in operation S850, the merging unit 230 may merge the images with the different focus positions, viewpoint transformation of which is performed, to generate an all-in-focus image.

Furthermore, operation S830 may be used by being implemented as a separate method and system. A detailed description therefor will be given with reference to FIGS. 10 and 11.

Figure 10:
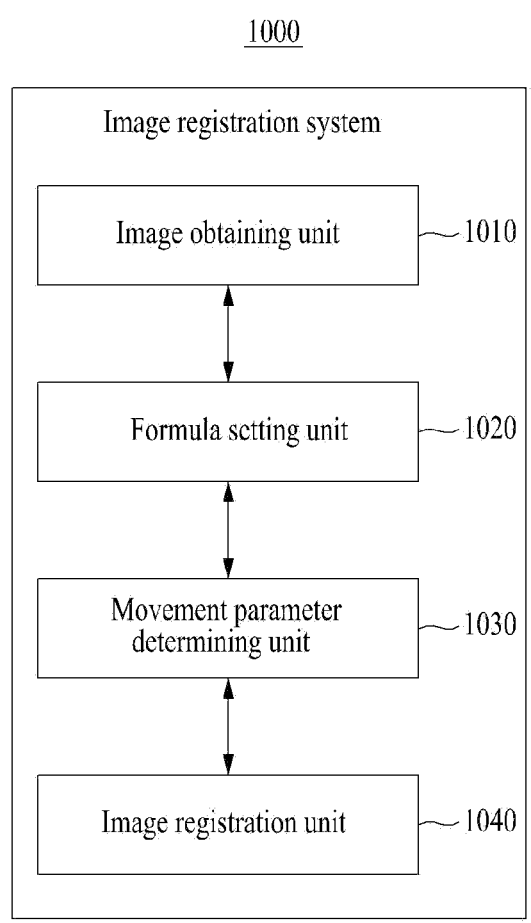
FIG. 10 is a block diagram illustrating a configuration of an image registration system according to an embodiment.
Figure 11:
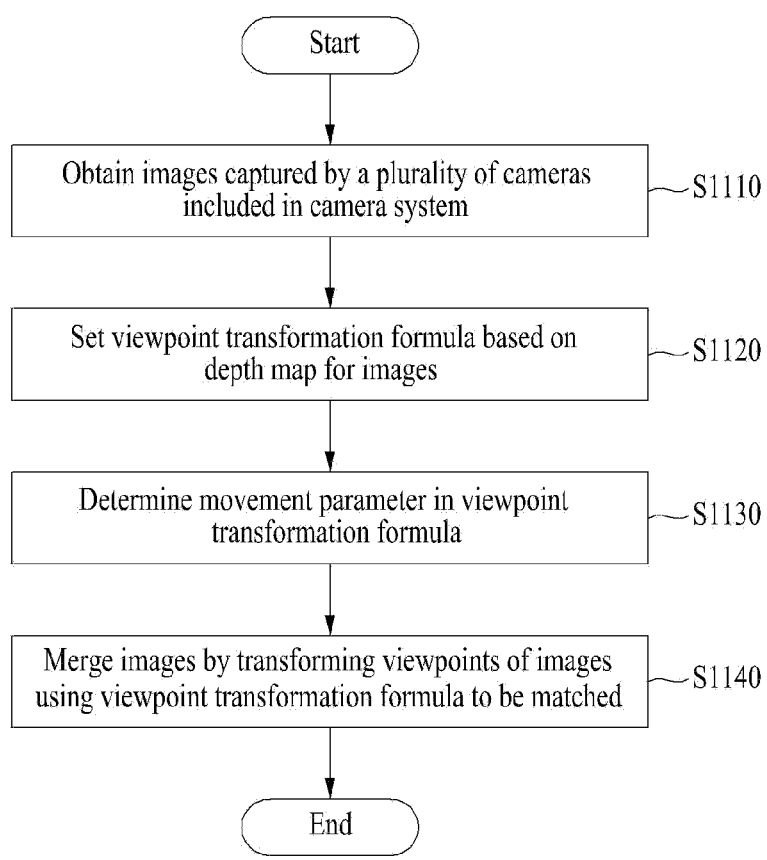
FIG. 11 is a flowchart illustrating an image registration method according to an embodiment.

FIG. 10 is a block diagram illustrating a configuration of an image registration system according to an embodiment. FIG. 11 is a flowchart illustrating an image registration method according to an embodiment.

Referring to FIGS. 10 and 11, an image registration system 1000 according to an embodiment may be configured as a processor included in a camera system including at least one camera. As shown, the image registration system 1000 may include an image obtaining unit 1010, a formula setting unit 1020, a movement parameter determining unit 1030, and an image merging unit 1040, which are components of the processor. According to an embodiment, the components of the processor may be selectively included or excluded from the processor. Furthermore, according to an embodiment, the components of the processor may be separated or merged for a representation of a function of the processor. For example, at least some of the components of the processor may be implemented in a processor included in a separate server communicatively connected with the camera system.

Such components of the processor may be implemented to execute instructions of a code of an operating system (OS) and instructions of at least one program (e.g., a program configured with a code executing an image registration method), included in a memory to perform operations S1110 to S1140 included in the image registration method.

Herein, the components of the processor may be representations of different functions according to instructions provided from a program code stored in the memory. For example, the image obtaining unit 1010 may be used as a functional representation for an operation of obtaining an image captured by the camera system.

Thus, the respective components of the processor may perform the image registration method by performing the following operations.

In operation S1110, the image obtaining unit 1010 may obtain images captured by a plurality of cameras included in the camera system (images simultaneously captured by the plurality of cameras).

Furthermore, in operation S1110, the image obtaining unit 1010 may further obtain a depth map for the images concurrently with obtaining the images. Hereinafter, the depth map for the images may be obtained as an image defining a relationship between parallax and depth throughout all pixels of each of the images through an existing algorithm of obtaining the depth map at the same time the images are captured. For example, the depth map may be obtained by simultaneously capturing a plurality of images using the plurality of cameras or sequentially capturing the plurality of images using one camera.

In operation S1120, the formula setting unit 1020 may set a viewpoint transformation formula (e.g., Equation 9 or 10 described above) based on a focal length of each of the plurality of cameras, a length of a baseline of the camera system, and parallax between the plurality of cameras, based on the depth map for the images.

In operation 1130, the movement parameter determining unit 1030 may determine a movement parameter in the viewpoint transformation formula.

Herein, the movement parameter may be a value associated with a distance to move when a location where each of the images is captured moves to a virtual specific location and may correspond to $m_x$, $m_y$, and $m_z$ in Equations 9 and 10 above. Thus, for the movement parameter determining unit 1030 to determine the movement parameter may refer to determining a distance to move, when an optical center of the camera system (or an optical center of at least one camera included in the camera system) moves to the virtual specific location, as the movement parameter.

As such, to determine the distance to move when the optical center of the camera system moves to the virtual specific location as the movement parameter, it may be essential to perform an operation of checking the optical center of the camera system. Although not illustrated, such an operation may be adaptively performed at any time (e.g., operation 1120) before operation S1130. Such an operation may be performed by experimentally searching for a location of a rotary axis of each of the plurality of cameras, parallax of which does not occur, when the rotary axis moves forward and backward and rotates left and right.

In operation S1140, the image merging unit 1040 may register the images by transforming viewpoints of the images using the viewpoint transformation formula to be matched. In other words, in operation S1140, the image merging unit 1040 may register the images by transforming a viewpoint of each of the images into a viewpoint of an image captured at the virtual specific location to match the viewpoints of the images.

The above-mentioned image registration method may further include operations S820 and/or S860 described above with reference to FIG. 8 other than the above-mentioned operations S1110 to S1140. In this case, the image registration system may perform an operation of filling a hole of the depth map before operation S1120 and may include an operation of filling a hole of each of the images, the viewpoint transformation of which is performed, in operation S1140 and may register the images, each of which has the filled hole.

As such, according to the above-mentioned embodiments, the image registration method for transforming the viewpoints of the images using the viewpoint transformation formula based on the depth map for the images and registering the images, the system therefor, and the computer program may be proposed, so the system may provide technology of transforming the viewpoints of the images as if the images are captured at a virtual specific location without a separate lighting device in a situation where a subject is moved and registering the images. Thus, the registered image may be widely used.

The foregoing devices may be realized by hardware components, software components, and/or combinations thereof. For example, the devices, and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to embodiments may be implemented with program instructions which may be executed through various computer means and may be recorded in computer-readable media. The media may also include, alone or in combination with the program instructions, data files, data structures, and the like. The program instructions recorded in the media may be designed and configured specially for an embodiments or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of embodiments, or vice versa.

According to an embodiment, the image merging method, the system therefor, and the computer program stored in a computer-readable storage medium to be combined with a computer and execute the image merging method may accurately register and merge images simultaneously captured by the plurality of cameras.

In detail, according to an embodiment, the image merging method, the system therefor, and the computer program may match viewpoints of images and registering and merging the images by performing viewpoint transformation for each of the images using a viewpoint transformation formula based on a depth map for the images simultaneously captured by the plurality of cameras.

According to an embodiment, the image merging method, the system therefor, and the computer program may enhance completion of a merged image by filling a hole in images, viewpoint transformation of which is performed, and the merged image.

According to an embodiment, technology may be used without the necessity of a separate lighting device in a situation where a subject is moved by registering and merging images simultaneously captured by the plurality of cameras, each of which has a different aperture or a different focus position, rather than using one fixed camera to change an aperture or a focus position of the camera and register and merge captured images.

According to an embodiment, the technology may be used in the field such as HDR imaging or focus stacking.

According to an embodiment, the image registration method, the system therefor, and the computer program stored in a computer-readable storage medium to be combined with a computer and execute the image registration method may match viewpoints of images and may register the images by performing viewpoint transformation for each of the images using a viewpoint transformation formula based on a depth map for the images.

According to an embodiment, technology may accurately register images without a separate lighting device in a situation where a subject is moved, thus widening utilization of the merged image.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. An image merging method using viewpoint transformation executed by a computer included in a camera system including a plurality of cameras, the method comprising:
   performing, by the camera system, viewpoint transformation for each image obtained by the plurality of cameras, using a depth map; and
   merging images, the viewpoint transformation of which is performed;
   wherein said performing the viewpoint transformation for each of the images comprises:
      setting a viewpoint transformation relationship including a backward warping relationship;
      determining a movement parameter in the viewpoint transformation relationship, the movement parameter being a value associated with a distance to move when a location at which each of the images is captured moves to a virtual specific location; and
      transforming viewpoints of the images to be matched using the viewpoint transformation relationship;
   wherein the backward warping is performed in accordance with the following relationship:

$$I(x, y) = I'\left(\frac{x'(fB + m_zD) + fm_xD}{fB} - c_{x'}, \frac{y'(fB + m_yD) + fm_zD}{fB} - c_{y}\right)$$

in which I(x, y) denotes the images captured by the plurality of cameras included in the camera system, x, y denote pixel locations in each of the images captured by the plurality of cameras included in the camera system, I'(x', y') denotes transformed images resulting from the viewpoint relationship which is performed, x', y' denote pixel locations in each of the transformed images resulting from the viewpoint transformation which is performed, f denotes a focal length of each of the plurality of cameras, B denotes a length of a baseline of the camera system, D denotes a parallax between the plurality of cameras, $m_x$, $m_y$, m denote the movement parameter, and $c_x$, $c_y$ denote coordinates of an image center passing through an optical axes.

2. The method of claim 1, wherein the determining of the movement parameter in the viewpoint transformation formula comprises:
   determining the movement parameter based on a distance to move when an optical center of each of the plurality of cameras moves to a virtual reference location of the camera system.

3. The method of claim 2, wherein said determining of the movement parameter in the viewpoint transformation relationship comprises:
   determining the movement parameter based on a length of a baseline of the camera system.

4. The method of claim 1, wherein said transforming the viewpoints of the images to be matched comprises:
   transforming the viewpoint of each of the images into a viewpoint of an image captured at a reference location of the camera system.

5. The method of claim 1, wherein said performing the viewpoint transformation for each of the images further comprises:
   filling a hole of the depth map before performing the viewpoint transformation for each of the images.

6. The method of claim 1, wherein said performing the viewpoint transformation for each of the images further comprises:
   filling a hole of each of the images, the viewpoint transformation of which is performed.

7. The method of claim 1, wherein the merging of the images, the viewpoint transformation of which is performed, further comprises:
   transforming a viewpoint of the merged image to fill a hole of the merged image.

8. The method of claim 1, wherein obtaining the images by the plurality of cameras comprises:
   obtaining the images with different exposure values from the plurality of cameras; and
   wherein said merging the images, the viewpoint transformation of which is performed, comprises:
      merging the images, with the different exposure values, the viewpoint transformation of which is performed, to generate a hyper dynamic range (HDR) image.

9. The method of claim 1, wherein each image captured by the plurality of cameras is obtained by:
   obtaining images with different focus positions from the plurality of cameras; and
   wherein said merging the images, the viewpoint transformation of which is performed, comprises:
      merging the images, with the different focus positions, the viewpoint transformation of which is performed, to generate an all-in-focus image.

10. An image merging system using viewpoint transformation, implemented with a computer included in a camera system, the system comprising:
   at least one processor configured to execute computer-readable instructions,
   wherein the at least one processor comprises:
      an image obtaining unit configured to obtain images captured by a plurality of cameras included in the camera system;
      a viewpoint transformation performing unit configured to perform viewpoint transformation for each of the images using a depth map for the images; and
      a merging unit configured to merge the images, the viewpoint transformation of which is performed;
   wherein said viewpoint transformation for each of the images comprises:

setting a viewpoint transformation relationship including a backward warping relationship;
determining a movement parameter in the viewpoint transformation relationship, the movement parameter being a value associated with a distance to move when a location at which each of the images is captured moves to a virtual specific location; and
transforming viewpoints of the images to be matched using the viewpoint transformation relationship;
wherein the backward warping is performed in accordance with the following relationship:

$$I(x, y) = I'\left(\frac{x'(fB + m_zD) + fm_xD}{fB} - c_{x'}, \frac{y'(fB + m_yD) + fm_zD}{fB} - c_y\right)$$

in which I(x, y) denotes the images captured by the plurality of cameras included in the camera system, x, y denote pixel locations in each of the images captured by the plurality of cameras included in the camera system, I'(x', y') denotes transformed images resulting from the viewpoint relationship which is performed, x', y' denote pixel locations in each of the transformed images resulting from the viewpoint transformation which is performed, f denotes a focal length of each of the plurality of cameras, B denotes a length of a baseline of the camera system, D denotes a parallax between the plurality of cameras, $m_x$, $m_x$, $m_z$ denote the movement parameter, and $c_x$, $c_y$, denote coordinates of an image center passing through an optical axes.

11. An image registration method executed by a computer included in a camera system, the method comprising:
obtaining images captured by a plurality of cameras included in the camera system;
setting a viewpoint transformation relationship based on a focal length of each of the plurality of cameras, a length of a baseline of the camera system, and parallax between the plurality of cameras, based on a depth map for the images;
determining a movement parameter in the viewpoint transformation formula, the movement parameter being a value associated with a distance to move when a location where each of the images is captured moves to a virtual specific location; and
registering images by transforming viewpoints of the images to be matched using the viewpoint transformation relationship;
wherein said setting the viewpoint transformation for each of the images further comprises:
setting a viewpoint transformation relationship including a backward warping relationship;
determining a movement parameter in the viewpoint transformation relationship, the movement parameter being a value associated with a distance to move when a location at which each of the images is captured moves to a virtual specific location; and
transforming viewpoints of the images to be matched using the viewpoint transformation relationship,
wherein the backward warping is performed in accordance with the following relationship:

$$I(x, y) = I'\left(\frac{x'(fB + m_zD) + fm_xD}{fB} - c_{x'}, \frac{y'(fB + m_yD) + fm_zD}{fB} - c_y\right)$$

in which I(x, y) denotes the images captured by the plurality of cameras included in the camera system, x, y denote pixel locations in each of the images captured by the plurality of cameras included in the camera system, I'(x', y') denotes transformed images resulting from the viewpoint relationship which is performed, x', y' denote pixel locations in each of the transformed images resulting from the viewpoint transformation which is performed, f denotes a focal length of each of the plurality of cameras, B denotes a length of a baseline of the camera system, D denotes a parallax between the plurality of cameras, $m_x$, $m_x$, $m_z$ denote the movement parameter, and $c_x$, $c_y$, denote coordinates of an image center passing through an optical axes.

12. The method of claim 11, wherein said determining the movement parameter in the viewpoint transformation formula comprises:
determining the movement parameter based on a distance to move when an optical center of each of the plurality of cameras moves to a virtual reference location of the camera system.

13. An image registration system implemented with a computer included in a camera system, the system comprising:
at least one processor configured to execute computer-readable instructions,
wherein the at least one processor comprises:
an image obtaining unit configured to obtain images captured by a plurality of cameras included in the camera system;
a formula setting unit configured to set a viewpoint transformation relationship based on a focal length of each of the plurality of cameras, a length of a baseline of the camera system, and parallax between the plurality of cameras, based on a depth map for the images;
a movement parameter determining unit configured to determine a movement parameter in the viewpoint transformation relationship, the movement parameter being a value associated with a distance to move when a location at which each of the images is captured moves to a virtual specific location; and
an image registration unit configured to register the images by transforming viewpoints of the images to be matched using the viewpoint transformation relationship;
wherein said performing the viewpoint transformation for each of the images further comprises:
setting a viewpoint transformation relationship including a backward warping relationship;
determining a movement parameter in the viewpoint transformation relationship, the movement parameter being a value associated with a distance to move when a location at which each of the images is captured moves to a virtual specific location; and
transforming viewpoints of the images to be matched using the viewpoint transformation formula;
wherein the backward warping is performed in accordance with the following relationship:

$$I(x, y) = I'\left(\frac{x'(fB + m_zD) + fm_xD}{fB} - c_{x'}, \frac{y'(fB + m_yD) + fm_zD}{fB} - c_y\right)$$

in which I(x, y) denotes the images captured by the plurality of cameras included in the camera system, x, y denote pixel locations in each of the images captured by the plurality of cameras included in the camera system, I'(x', y') denotes transformed images resulting from the viewpoint relationship which is performed, x', y' denote pixel locations in each of the transformed images resulting from the viewpoint transformation which is performed, f denotes a focal length of each of the plurality of cameras, B denotes a length of a baseline of the camera system, D denotes a parallax between the plurality of cameras, $m_x$, $m_x$, $m_z$ denote the movement parameter, and $c_x$, $c_y$, denote coordinates of an image center passing through an optical axes.

* * * * *

UNITED STATES PATENT AND TRADEMARK OFFICE
CERTIFICATE OF CORRECTION

PATENT NO. : 10,972,712 B2  
APPLICATION NO. : 16/201906  
DATED : April 6, 2021  
INVENTOR(S) : Ki Yeong Park Page 1 of 1

It is certified that error appears in the above-identified patent and that said Letters Patent is hereby corrected as shown below:

In the Claims

Column 15, Line 65, Claim 1:
"the plurality of cameras, $m_x$, $m_y$, m denote the movement"
Should read:
--the plurality of cameras, $m_x$, $m_y$, $m_z$ denote the movement--.

Column 17, Line 29, Claim 10:
"between the plurality of cameras, $m_x$, $m_x$, $m_z$ denote the"
Should read:
--between the plurality of cameras, $m_x$, $m_y$, $m_z$ denote the--.

Column 18, Line 12, Claim 11:
"between the plurality of cameras, $m_x$, $m_x$, $m_z$ denote the"
Should read:
--between the plurality of cameras, $m_x$, $m_y$, $m_z$ denote the--.

Column 19, Line 9, Claim 13:
"between the plurality of cameras, $m_x$, $m_x$, $m_z$ denote the"
Should read:
--between the plurality of cameras, $m_x$, $m_y$, $m_z$ denote the--.

Signed and Sealed this  
Second Day of August, 2022

Katherine Kelly Vidal  
*Director of the United States Patent and Trademark Office*